United States Patent
Nagel et al.

(10) Patent No.: US 10,184,377 B2
(45) Date of Patent: Jan. 22, 2019

(54) METHOD FOR OPERATING AN EXHAUST GAS AFTERTREATMENT SYSTEM OF A MOTOR VEHICLE

(71) Applicant: Robert Bosch GmbH, Stuttgart (DE)

(72) Inventors: Cornelia Nagel, Stuttgart (DE); Alexander Franz, Gaertringen (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 15/445,079

(22) Filed: Feb. 28, 2017

(65) Prior Publication Data
US 2017/0248052 A1  Aug. 31, 2017

(30) Foreign Application Priority Data
Feb. 29, 2016  (DE) .................. 10 2016 203 225

(51) Int. Cl.
| F01N 3/08 | (2006.01) |
|---|---|
| F01N 3/20 | (2006.01) |
| F01N 9/00 | (2006.01) |
| F01N 11/00 | (2006.01) |
| F01N 3/035 | (2006.01) |

(52) U.S. Cl.
CPC ........... F01N 3/208 (2013.01); F01N 3/0842 (2013.01); F01N 3/0871 (2013.01); F01N 3/2006 (2013.01); F01N 3/2066 (2013.01); F01N 9/00 (2013.01); F01N 9/002 (2013.01); F01N 11/00 (2013.01); F01N 3/035 (2013.01); F01N 2550/02 (2013.01); F01N 2550/03 (2013.01); F01N 2570/14 (2013.01); F01N 2610/02 (2013.01); F01N 2900/0408 (2013.01); F01N 2900/0411 (2013.01); F01N 2900/1622 (2013.01); Y02A 50/2325 (2018.01); Y02T 10/24 (2013.01); Y02T 10/47 (2013.01)

(58) Field of Classification Search
CPC ...... F01N 3/035; F01N 3/0842; F01N 3/0871; F01N 3/2006; F01N 3/2066; F01N 3/208; F01N 9/00; F01N 9/002; F01N 11/00; F01N 2550/02; F01N 2550/03; F01N 2570/14; F01N 2610/02; F01N 2900/0408; F01N 2900/0411; F01N 2900/1622; Y02T 10/24; Y02T 10/47; Y02A 50/2325
See application file for complete search history.

(56) References Cited

U.S. PATENT DOCUMENTS

| 2012/0060477 A1* | 3/2012 | Alm et al. ............. F01N 3/023 60/274 |
|---|---|---|
| 2014/0186220 A1* | 7/2014 | Sakurai et al. ....... F01N 3/2053 422/108 |

FOREIGN PATENT DOCUMENTS

| JP | 2012172545 A | * | 9/2012 | |
|---|---|---|---|---|
| WO | WO 2015045378 A1 | * | 4/2015 | ............. F01N 11/00 |

* cited by examiner

Primary Examiner — Audrey K Bradley
(74) Attorney, Agent, or Firm — Michael Best & Friedrich LLP

(57) ABSTRACT

In the case of a method for operating an exhaust gas aftertreatment system of a motor vehicle, the exhaust gas aftertreatment system comprises at least one NOx storage catalyst (10) and at least one SCR catalyst (30). According to the invention, when an inadequate function of the NOx storage catalyst (10) or of the SCR catalyst (30) is identified, at least one auxiliary measure is initiated which leads to a reduction of the NOx emissions of the motor vehicle.

5 Claims, 1 Drawing Sheet

METHOD FOR OPERATING AN EXHAUST GAS AFTERTREATMENT SYSTEM OF A MOTOR VEHICLE

BACKGROUND OF THE INVENTION

The present invention relates to a method for operating an exhaust gas aftertreatment system of a motor vehicle, wherein the exhaust gas aftertreatment system comprises at least one NOx storage catalyst and at least one SCR catalyst. Furthermore, the invention relates to a computer program, a machine-readable storage medium and an electronic control device, which are provided for carrying out the method.

In order to reduce the pollutant concentrations in the exhaust gas of the internal combustion engine of a motor vehicle, use is made of complex exhaust gas aftertreatment systems. To reduce nitrogen oxygen emissions, it is already known to combine a Nitrogen oxide Storage Catalyst (NSC) with a SCR catalyst (Selective Catalytic Reduction). The nitrogen-oxide-reducing effect of the NSC is based on NOx (NOx—nitrogen oxides) being stored in the regular lean-burn mode of the engine. The NSC is regenerated by an intermittent provision of reducing agents in the exhaust gas, as a result of which the stored NOx can be reduced. This can take place in particular by means of a rich-burn mode of the engine ($\lambda<1$), wherein, after such a regeneration, the NSC is again capable of absorbing NOx.

Since the rich-burn mode carried out during the regeneration of the NSC increases the fuel requirement, the regeneration function for the NSC is generally applied by the vehicle manufacturer in such a manner that the regeneration is carried out as rarely as possible, but nevertheless as often as required, in order to be able to keep to the predetermined NOx limit values. The regeneration time is made dependent on higher-ranking criteria, such as, for example, the NOx charging of the NSC, and is therefore generally not variable in terms of time within a predetermined driving cycle having the same starting conditions since this would lead either to an increased fuel consumption or to higher NOx emissions.

The basic principle of an SCR catalyst consists in reducing nitrogen oxide molecules on the catalyst surface in the presence of ammonia ($NH_3$) as reducing agent to form elemental nitrogen. The required reducing agent is introduced here, for example in the form of an aqueous urea solution, into the exhaust tract upstream of the SCR catalyst by a metering device. The required metering rate is determined in an electronic control unit in which strategies for the operation and the monitoring of the SCR system are generally stored.

In the case of a combination of an NSC and an SCR catalyst in an exhaust gas aftertreatment system, the emission load can be distributed to the NSC and to the SCR catalyst in a temperature-dependent manner. The NSC primarily takes on the reduction of the nitrogen oxide concentration here after a cold start, since, after a cold start, the SCR catalyst is generally still too cold to achieve good NOx conversion. If the SCR catalyst has reached its operating temperature, and a sufficiently large SCR catalyst is installed, the SCR catalyst can achieve the required NOx conversion rate by itself. In this case, regeneration of the NSC can be switched off in order thereby to save fuel.

Legal regulations in the sphere of the diagnostic analysis of emission-relevant components require, within the scope of what is referred to as on-board diagnosis (OBD), the monitoring of all exhaust gas aftertreatment components and of the sensor arrangement used in respect of maintaining the OBD limit values for the NOx emissions of the motor vehicle. OBDII legislation requires individual component monitoring in this case, and therefore each individual catalyst has to be monitored for the maintaining of the OBD limit value. It is therefore required for a possibly defective catalyst within a system to be unambiguously identified.

SUMMARY OF THE INVENTION

The method according to the invention is provided for operating an exhaust gas aftertreatment system of a motor vehicle, wherein the exhaust gas aftertreatment system comprises at least one NOx storage catalyst and at least one SCR catalyst. The essence of the invention is that, in the event of an inadequate function of one of the two catalysts, at least one auxiliary measure is initiated which leads to the reduction of the NOx emissions of the motor vehicle. If an inadequate function of the NOx storage catalyst (NSC) or the SCR catalyst is therefore identified, an improved exhaust gas aftertreatment in respect of the nitrogen oxide emissions can be obtained by initiating at least one auxiliary measure, and therefore as few NOx emissions as possible are released by the motor vehicle over the distance from the time of identification of the fault to the garage.

If, in an exhaust gas aftertreatment system which combines at least one NSC and at least one SCR catalyst with each other, one of said two components can no longer adequately make its contribution to reducing the NOx emissions, the permissible limit values of the NOx emissions can no longer be kept to during conventional operation of the system. Conventionally, the defective component is generally indicated only in the operating software in the form of an error code. Said error code is correspondingly further processed and optionally displayed to the driver. If the defective component is not repaired, increased NOx emissions of the motor vehicle occur. The invention solves this problem in that, when an inadequate function of the NSC or of the SCR catalyst is identified, auxiliary measures for reducing the NOx emissions are initiated, and therefore, despite a failure of one of the two exhaust gas aftertreatment components, the NOx emissions that are inadequately compensated for because of the defective catalyst can be further reduced. The auxiliary measures initiated according to the invention are designed here in such a manner that in each case one of the two catalysts can at least partially take on the tasks of the other, defective catalyst in each case. In the event of an error, the emission load can therefore be transferred, according to the invention, to the exhaust gas aftertreatment components which are still usable. In principle, two situations can be differentiated here. Either the SCR catalyst or the NSC catalyst is identified as being defective. The respectively initiated auxiliary measures are dependent on which catalyst is defective.

In the event of an inadequate function of the SCR catalyst, a more frequent regeneration of the NSC in comparison to the normal mode is preferably carried out. By this means, the stored NOx mass of the NSC can be discharged, and therefore capacity of the NSC for storing NOx is increased again and the defective or reduced NOx conversion via the defective SCR catalyst can thereby be compensated for. The regeneration of the NSC is preferably carried out in a manner known per se by a rich-burn mode of the internal combustion engine of the motor vehicle. The more frequent regeneration of the NSC in accordance with the method according to the invention can advantageously be initiated here by changing a threshold for an operating condition at which a regeneration is intended to be carried out. For example, the NOx mass threshold which is provided for initiating the regeneration can be lowered. Furthermore, it is possible to change the threshold for the temperature of the NOx storage catalyst or for the exhaust gas mass flow or for the engine operating point or for the predicted additional fuel consumption. This leads to the regeneration of the NOx storage catalyst being carried out more frequently than in the normal mode.

If the other situation occurs and an inadequate function of the NSC is determined, at least one auxiliary measure which improves the operating conditions for the SCR catalyst is preferably initiated within the scope of the method according to the invention. By this means, the operating conditions for the SCR catalyst can be set in such a manner that an optimum NOx conversion rate in the SCR catalyst is possible. It is particularly preferred here to initiate a measure for heating up the exhaust gas aftertreatment system as the auxiliary measure, and therefore the temperature of the SCR catalyst is increased and therefore NOx conversion can be optimized. Conventionally, the temperature level is frequently lower in an exhaust gas aftertreatment system with an NSC and an SCR catalyst than in an exhaust gas aftertreatment system without an NSC. The optimum temperatures for the operation of the SCR catalyst are therefore conventionally reached more rarely or later in a combined system. This is used according to the invention in order, in the event of a deficient function of the NSC, to retrieve this incompletely used capacity of the SCR catalyst as the need arises. According to the method according to the invention, the exhaust gas aftertreatment system is therefore correspondingly heated up as the need arises and the necessary temperature level is kept for a length of time sufficient for better SCR operating temperatures to be set and for the NOx emission load to be able to be transferred to the SCR catalyst. The SCR catalyst can therefore make a greater contribution to the NOx conversion and can reduce the NOx emissions of the motor vehicle overall.

As an alternative or additional auxiliary measure in this connection, an adaptation of at least one operating variable of the SCR catalyst can be undertaken, as a result of which an increased NOx conversion rate can likewise be achieved in the SCR catalyst. For example, if the SCR catalyst is operated in a pilot-controlled mode, a switch can be made from a pilot-controlled mode to a closed-loop-control mode of the SCR catalyst, and therefore a high NOx conversion rate is achieved at all operating points. In such cases in which, during the operation of the SCR catalyst, a change is made to and fro between a closed-loop-control and an open-loop-control mode, depending on the current environmental conditions, as a replacement measure within the course of the method according to the invention the change from a closed-loop-control mode to an open-loop-control mode can be blocked or suppressed, and therefore a high NOx conversion is also ensured here at all operating points. If the SCR catalyst is operated under level regulation in respect of the $NH_3$ level, the change to a higher $NH_3$ desired level can furthermore be triggered as a replacement measure, and therefore a greater buffer for possibly occurring NOx peaks is kept ready and in sufficient reduction of the NOx emissions by the defective NSC can be compensated for.

Under some circumstances, the initiated auxiliary measures may be associated with an increased fuel consumption, in particular in the event of heating-up measures of the exhaust gas aftertreatment system, or with an increased consumption of the reducing agent (for example AdBlue®) in the SCR catalyst, in particular in the event of a closed-loop-control mode of the SCR catalyst initiated as an auxiliary measure. These effects, which are disadvantageous to a certain extent, of the method according to the invention are, however, compensated for by the fact that overall the NOx emissions of the motor vehicle in the event of an error of the NSC or of the SCR catalyst are compensated for within the scope of the method according to the invention.

The invention furthermore comprises a computer program which is designed for carrying out the steps of the method according to the invention for operating an exhaust gas aftertreatment system and in particular for compensating for the increased NOx emissions in the event of an error of one of the exhaust gas aftertreatment components. Furthermore, the invention comprises a machine-readable storage medium on which such a computer program is stored, and also an electronic control device which is designed for carrying out the operating method according to the invention. The realization of the method according to the invention as a computer program or as a machine-readable storage medium or as an electronic control device has the particular advantage that the method according to the invention can then also be used, for example, in existing motor vehicles which have a corresponding exhaust gas aftertreatment system.

BRIEF DESCRIPTION OF THE DRAWINGS

Further features and advantages of the invention emerge from the description below of exemplary embodiments in conjunction with the drawings. The individual features can be realized here in each case by themselves or in combination with one another.

In the drawings.

DETAILED DESCRIPTION

Figure 1:
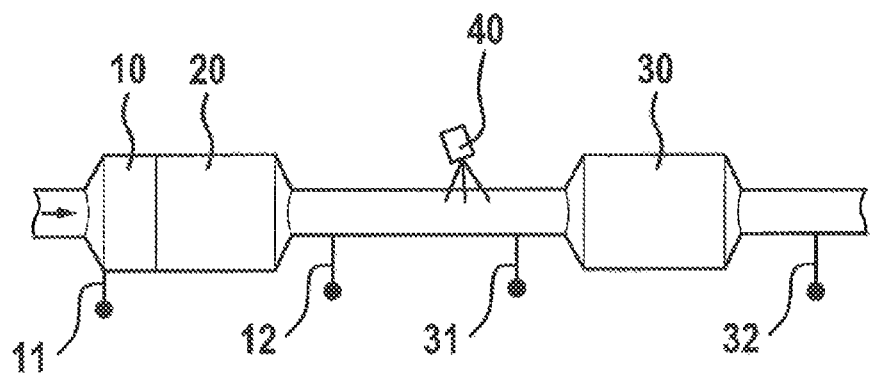
FIG. 1 shows a schematic illustration of an exemplary refinement of an exhaust gas aftertreatment system from the prior art, in which the operating method according to the invention can be used.

FIG. 1 shows, in a schematic manner, an exemplary construction of an exhaust gas aftertreatment system from the prior art, in which the method according to the invention can be used. The exhaust tract of an internal combustion engine (not shown specifically) of a motor vehicle is illustrated. The exhaust gas of the internal combustion engine flows through the exhaust tract in the arrow direction. The exhaust gas aftertreatment system comprises an NOx storage catalyst (NSC) 10, a diesel particle filter (cDPF) 20 and an SCR catalyst (SCR) 30. A metering point 40 for the required liquid reducing agent solution (for example AdBlue®) is located upstream of the SCR 30. A lambda probe 11, 12 is in each case located upstream and downstream of the NSC 10. An NOx sensor 31, 32 is in each case located upstream and downstream of the SCR 30. The NOx sensor 31 which is located upstream of the SCR 30 can optionally be replaced by a calculated model value. In such a combined exhaust gas aftertreatment system with an NSC 10 and an SCR 30, the two catalysts contribute their part in maintaining the NOx limit values. If one of the two catalysts 10, 30 is no longer capable of functioning correctly, the NOx emissions which occur can no longer be adequately compensated for. In general, the defective component is indeed displayed. However, in the conventional situation, an increase of the NOx emissions of the motor vehicle occurs until the defective component is repaired. These increased NOx emissions are avoided or at least reduced with the operating method according to the invention since, according to the method according to the invention, in the event of an error of one of the two catalysts 10 or 30, suitable replacement measures (auxiliary measures) are taken in order to use the other, still functioning exhaust gas aftertreatment components in each case to compensate for insufficient exhaust gas aftertreatment. The operating conditions for such a combined system are customarily designed in such a manner that both the NSC 10 and the SCR 30 are operated in one driving cycle. According to the invention, in the event of an error of the NSC 10 or of the SCR 30 (escalation situation), the operating conditions for the other catalyst in each case are selected and influenced in such a manner that the functioning component is increasingly used for reducing the NOx emissions.

Figure 2:
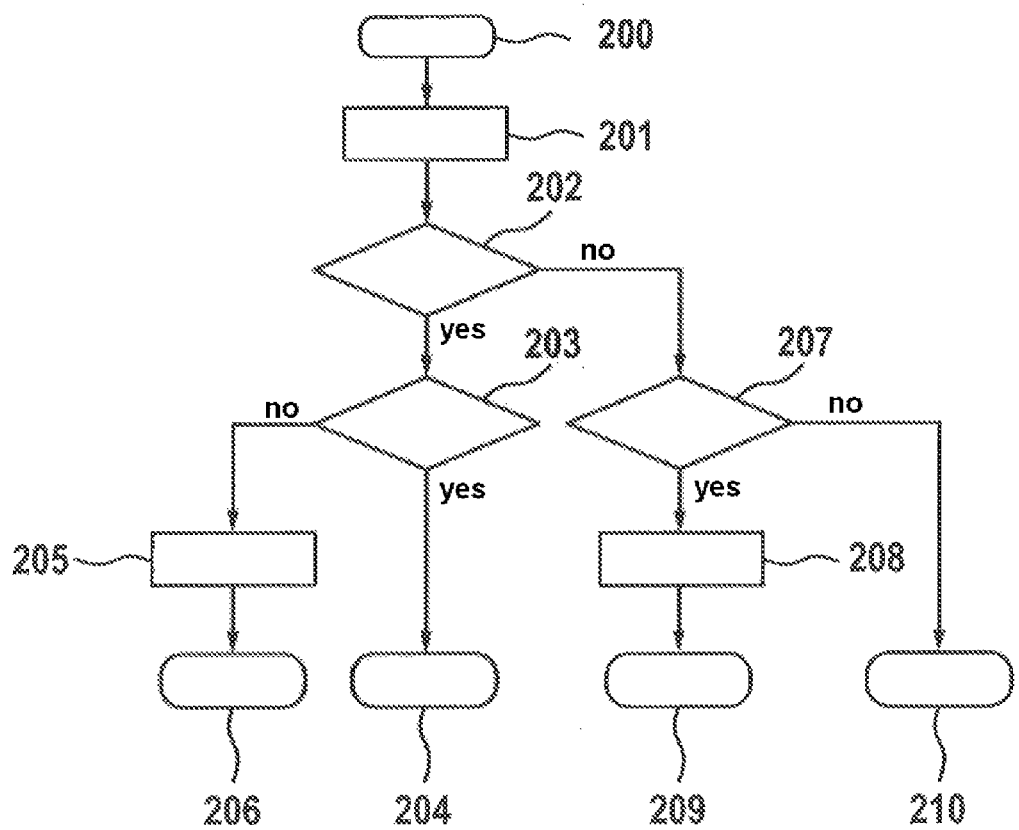
FIG. 2 shows a schematic flow diagram of an exemplary embodiment of the method according to the invention.

An exemplary flow chart for the approach according to the method according to the invention in the event of an error and the auxiliary measures which are going to be initiated is illustrated in FIG. 2. During the driving cycle, the OBD monitoring functions are active here both for the NSC and for the SCR catalyst. Accordingly, after the start 200 of the method, the functions of the NSC and of the SCR catalyst are checked in step 201. In this context, it is initially enquired in step 202 whether the function of the NSC is in order. If this is the case, it is enquired in step 203 whether the function of the SCR catalyst is in order. If this is the case, it is output in step 204 that the exhaust gas aftertreatment system is in order in respect of the degradation of nitrogen oxides. However, if the enquiry in step 203 reveals that the function of the SCR catalyst is not in order, one or more auxiliary measures are requested in step 205, said auxiliary measures leading to the deficient NOx conversion in the SCR catalyst being compensated for via the NSC. In particular, a more frequent or additional regeneration of the NSC is requested here. By this means, the NOx charging of the NSC can be degraded, and therefore the NSC is ready for increased storage of NOx. The request in step 205 thus leads to the auxiliary measure 206, wherein the NSC is emptied more frequently because of the increased regeneration, and therefore the NOx charging of the NSC is reduced and the NSC can make a greater contribution to degrading the nitrogen oxides.

If the enquiry in step 202 reveals that the function of the NSC is not in order, it is enquired in step 207 whether the function of the SCR catalyst is in order. If this is the case, a different type of operation for the SCR catalyst is requested in step 208, as a result of which the operating conditions for the SCR catalyst are improved, and therefore the SCR catalyst can compensate for the deficient reduction of the nitrogen oxides by the defective NSC. In particular, a heating mode for the exhaust gas aftertreatment system can be requested here, as a result of which the temperature in the SCR catalyst is increased as an auxiliary measure in step 209. By this means, a suitable and optimum temperature level for the SCR catalyst is set, and therefore the SCR catalyst can make a greater contribution to degrading the nitrogen oxides. If the request in step 207 reveals that the function of the SCR catalyst is also not in order, it is output in step 210 that both the NSC and the SCR catalyst are defective. Further auxiliary measures are not expedient in this case.

Depending on the result of the monitoring functions, in principle four scenarios can therefore occur:

Scenario 1 (Step 206):

The SCR catalyst is no longer completely capable of functioning and the NSC is intact and can contribute, according to the invention, to the further reduction of the NOx emissions. The NSC is used here to an increased extent for NOx reduction throughout the entire driving cycle. For this purpose, an intervention is made in the normal operation and corresponding auxiliary measures taken for the inadequate SCR operation. So that the NSC can make a greater contribution to reducing the nitrogen oxide emissions, the NOx stored in the NSC is reduced by increased and more frequent regeneration of the NSC, and therefore further NOx absorption in the NSC is possible. In comparison to the normal operation, increased NSC regenerations are carried out here. This intervention can take place, for example, by reducing the NOx mass threshold during which NSC regeneration is initiated. Furthermore, it is possible to carry out the regeneration by changed operating conditions both of the engine and of the NSC. For example, the thresholds for the NSC temperature, for the exhaust gas mass flow, for the engine operating point or for the predicted additional fuel consumption can be changed in order to adapt the frequency of the NSC regeneration to the changed conditions.

Scenario 2 (Step 204):

In this case, both the NSC and the SCR catalyst are in order. That is to say that the NOx emissions can be reduced as intended. No replacement measures are necessary.

Scenario 3 (Step 209):

The NSC is no longer completely capable of functioning. However, the SCR catalyst is intact and can contribute to the further reduction of the NOx emissions. For this purpose, the SCR catalyst is increasingly used for the NOx conversion throughout the entire driving cycle. For this purpose, an intervention is made in the normal operation and corresponding auxiliary measures are taken for the inadequate NSC mode. In particular, the exhaust gas system can be correspondingly heated up and an increased temperature level for better SCR operation can be maintained for a period sufficient so that the operation of the SCR catalyst can make a greater contribution to reducing the NOx emissions. In addition to an increase of the SCR temperature, the operating variables of the SCR can also be adapted to an increased NOx conversion. For example, a change can be made from a pilot-controlled mode of the SCR catalyst to a closed-loop-control mode, or an optionally provided standard change from a closed-loop-control mode to an open-loop-control mode can be suppressed. Furthermore, it is possible, as a replacement measure, to change to a higher $NH_3$ desired level of the SCR catalyst.

Scenario 4 (Step 210):

In this case, both the NSC and the SCR catalyst are defective. That is to say that the NOx emissions cannot be reduced as intended. In this case, the replacement measures according to the method according to the invention are not expedient.

In conventional diagnosis functions for the NSC and the SCR catalyst, two individual error tests are often carried out, the results of which make it possible to draw a conclusion about the degree of possibly present damage of the NSC or of the SCR catalyst. For example, there is a first error code for total failure or for removal of the component and there is a second error code which provides information about a certain aging and reduction of the functioning capability. In which of these two or these four error cases which auxiliary measure is initiated according to the method according to the invention can be selected in adaptation to the respective applications. For example, the described auxiliary measures can be initiated if only a certain aging and reduction of the functioning capability of one of the two exhaust gas aftertreatment components is determined. In other applications, the initiation of auxiliary measures can be restricted to the situations in which one of the two exhaust gas aftertreatment components completely fails.

The invention claimed is:

1. A method for operating an exhaust gas aftertreatment system of a motor vehicle, wherein the exhaust gas aftertreatment system comprises at least one NOx storage catalyst (10) and at least one SCR catalyst (30), the method comprising;
   identifying, with an electronic control device, an inadequate function of the at least one SCR catalyst, and
   in response to determining the inadequate function, implementing, based upon a control signal from the electronic control device, a measure for reducing NOx emissions of the motor vehicle, wherein the measure includes carrying out a more frequent regeneration of the NOx storage catalyst (10) in comparison to a normal mode.

2. The method according to claim 1, wherein the more frequent regeneration of the NOx storage catalyst (10) is initiated by changing a threshold for an operating condition at which a regeneration is intended to be carried out.

3. An electronic control device which is designed to carry out the steps of a method according to claim 1.

4. A computer program which is designed to carry out the steps of a method according to claim 1.

5. A non-transitory machine-readable storage medium on which a computer program according to claim 4 is stored.

* * * * *